July 12, 1966 J. C. BACON 3,260,026
SOLAR SCREEN
Filed Feb. 24, 1964 2 Sheets-Sheet 1

INVENTOR
JAMES C. BACON
BY
ATTORNEY

July 12, 1966 J. C. BACON 3,260,026
SOLAR SCREEN
Filed Feb. 24, 1964 2 Sheets-Sheet 2

INVENTOR
JAMES C. BACON
BY E. Janet Berry
ATTORNEY 3,260,026
SOLAR SCREEN
James C. Bacon, Woodland Hills, Calif., assignor, by mesne assignments, to Alcan Aluminum Corporation, New York, N.Y., a corporation of New York
Filed Feb. 24, 1964, Ser. No. 346,628
9 Claims. (Cl. 52—473)

This invention relates to solar screens and more particularly to such screens having novel and ornamental configuration and designed to filter as much direct light as possible while permitting sufficient illumination to pass through the screen so that persons on the rear or shaded side thereof will have sufficient light for the normal performance of their tasks or customary activities. Stated otherwise, the invention is directed to a structural assembly having screen-like characteristics, intended principally for association with the exterior wall of a building, and designed to substantially shade said wall, particularly where there may be windows or other openings therein, against direct sunlight and without interfering with the passage of sufficient light for normal activities.

It has been known heretofore to provide exterior means for shading window openings, and the like, and masonry wall structures have been utilized for such purposes. Auxiliary walls of this character are not only cumbersome and costly but provide serious structural problems when the wall to be screened is of substantial height. Further, such auxiliary wall structures have detracted seriously from the architectural beauty of the building to be shaded.

The present invention is directed to novel screen structure which departs from prior art practices and eliminates the disadvantages thereof, providing an effective solar screen which will enhance the aesthetic appeal of the structure being shaded and, at the same time, will provide a maximum of shade and a minimum of interference with the passage therethrough of indirect light rays.

An important object of the present invention is to provide a novel solar screen of the class set forth which may be assembled conveniently into relatively light-weight units of dimensions, particular reference being had to length and height, having relationship to the wall area to be shaded.

A further object of the present invention is to provide a novel screen of the class set forth which will eliminate solar glare and radiant heat on the exterior of a building structure, thus reducing eye fatigue and interior cooling requirements, consideration being given to air-conditioning systems and the like.

It is a still further object of the invention to provide a novel and ornamental solar screen which may, if desired, be attached to the exterior of a building structure, at the ground level or otherwise, depending upon the area to be shaded.

A further object of the invention is to provide a novel solar screen intended to be secured to or supported upon a building wall, in spaced relation thereto, and which will provide the structure with an architectonic atmosphere.

A still further object of the present invention is to provide a novel solar screen which will be durable and light in weight, and which may be assembled with particular economy without requirement for costly materials or highly skilled labor.

Further objects of the invention will be readily apparent from the following description, taken in conjunction with the accompanying drawings, wherein.

Figure 1:
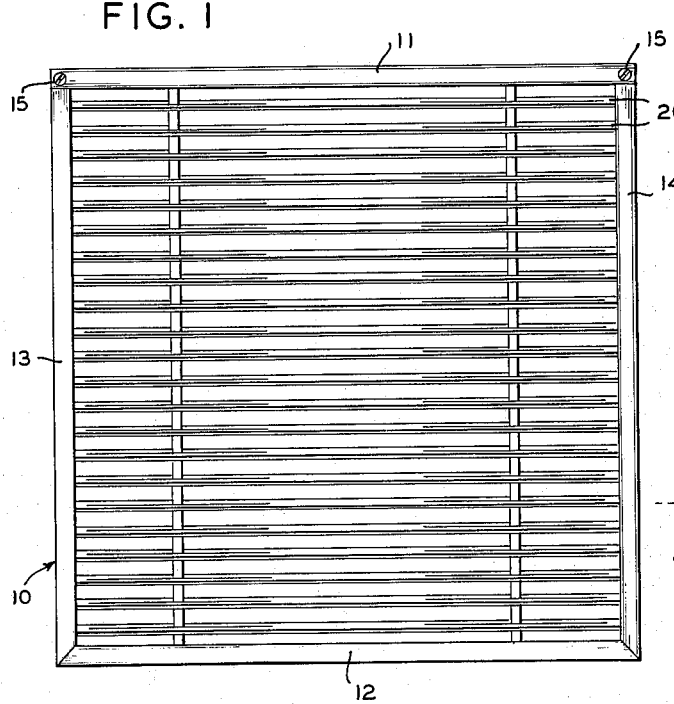
FIGURE 1 is a front elevational view of a solar screen constructed in accordance with the present invention and illustrating an initial condition thereof during the assembly operation.
Figure 3:
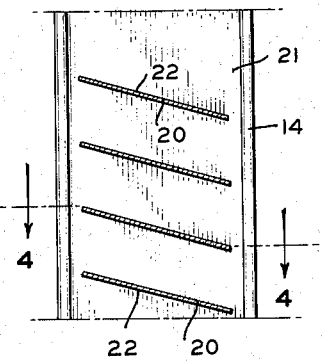
FIGURE 3 is a detail sectional view, on an enlarged scale, taken on the line 3—3 of FIGURE 2.
Figure 2:
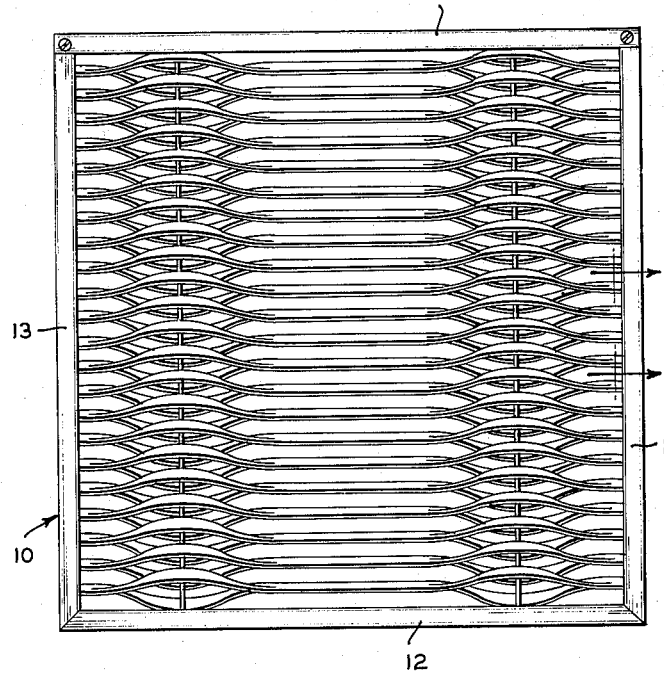
FIGURE 2 is a front elevational view of the solar screen of FIGURE 1 illustrating the horizontally disposed slats or panels thereof in final adjusted or expanded relationship.
Figure 4:
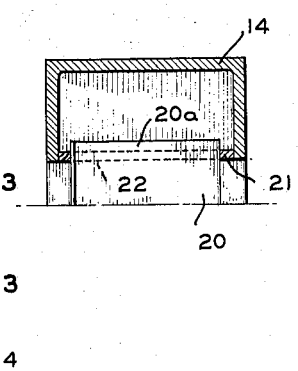
FIGURE 4 is a detail sectional view taken on the line 4—4 of FIGURE 3.

As shown in the drawings, particular reference being had to FIGURES 1 and 2 thereof, the solar screen of the present invention is a self supporting structure and includes suitable frame means indicated generally at 10 and having an upper portion 11, a base or bottom portion 12 and side portions 13 and 14. For convenience of assembly, each of these portions is U-shaped and may be extruded or otherwise produced from relatively light-weight metal such as an aluminum alloy or the like. If desired, the base and side portions may be produced as a unitary structure with suitable fastening means being provided, such as screws 15, or the like, for securing the top portion 11 to the upper extremities of the side portions 13 and 14. Thus, the side portions may constitute facing channel members for the reception of the extremities of horizontally disposed panel members 20 to be described more fully hereafter.

It will be understood that the width of these slat-like panel members is slightly less than the depth of the side portions of the frame 10 and may be measured in inches as distinguished from the width and height of the solar screen which may be as large as required for any specific area to be shaded. Accordingly, the solar screen contemplated is relatively thin, or narrow, in relationship to the other dimensions thereof.

Each of the slat-like panels 20 is produced from relatively thin and light-weight metal having inherent flexibility and a plurality thereof are mounted in horizontally disposed and spaced relationship between the side portions 13 and 14 of the frame 10, the arrangement being such as to prevent direct passage of any light rays through the solar screen.

The length of each panel member is slightly greater than the distance between the opposed inner edges of the side portions 13 and 14; thus, the extremities 20a of the panel members 20 extend a relatively short distance into the facing channels provided by said side members and suitable means is provided for retaining the panels in horizontally spaced relationship. A preferred embodiment of such means comprising spacer plates 21, fitting snugly between the opposed vertical walls of the side portions 13 and 14 and provided with spaced slots 22 through which the extremities 20a of the panel members 20 project. While each panel member 20 may be disposed in a transverse as well as longitudinal horizontal plane, a preferable arrangement is one where said members are inclined upwardly toward the side of the screen to be shaded, the angular relationship being on the order of 15° to 45°, thereby not only preventing direct passage of light rays, as in the early or late hours when the sun is rising or setting, but also directing screened light rays in an upward direction.

The relationship between the spacer plates 21 and the side portions 13 and 14 of the frame 10 is such that the U-shaped channels are entirely closed and the interior thereof is protected from inclement weather (rain and snow) and accumulation therein of dust or debris is effectively prevented. It will be apparent that, if desired, the sides of the frame 10 may be produced from tubular elements in which event the spacing slots may be stamped out or otherwise produced in the facing walls thereof. So, too, with the top and bottom frame members 11 and 12; where these latter members are constituted by U-shaped channels, suitable closure plates, similar to the spacer plates 21 may be provided.

Figure 7:
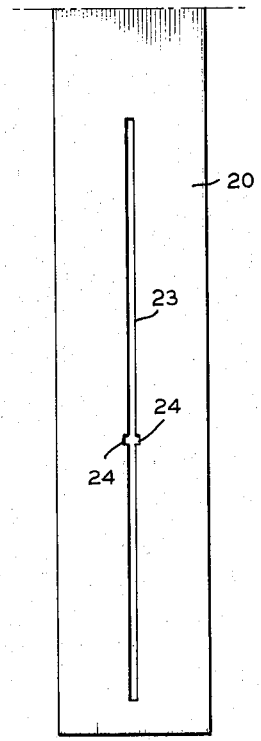
FIGURE 7 is a top plan view of an extremity of a panel element constructed in accordance with the present invention.
Figure 6:
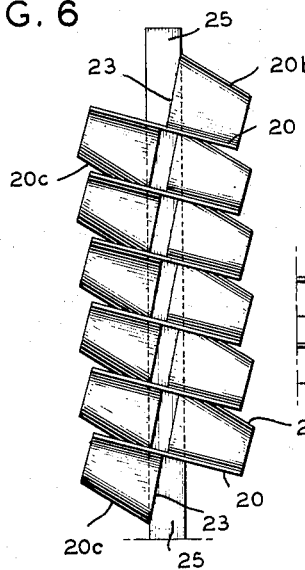
FIGURE 6 is an end elevational view of the assembly illustrated in FIGURE 5.
Figure 8:
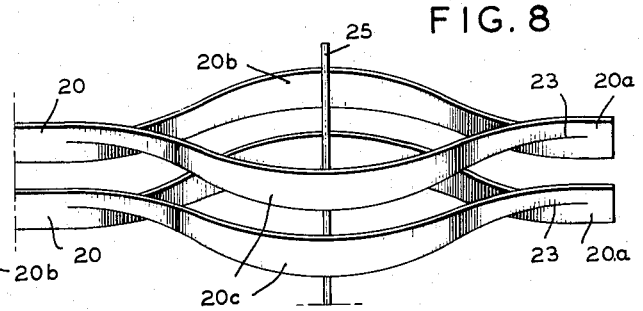
FIGURE 8 is a fragmentary elevational view illustrating a pair of panels in normal expanded configuration.

As shown more particularly in FIGURE 7 of the drawings, each panel member or slat 20 is provided with at least one centrally located longitudinally disposed slot 23, each longitudinal edge of said slot being provided with a centrally located notch 24, these notches being carefully located in mating or opposed and complementary relationship.

The slots 23 are relatively narrow and are intended for the reception of a vertically disposed spring or spreader bar 25 which is inserted through the vertically aligned slots 23 of the plurality of slats or panel members 20 required to make up the particular solar screen being assembled, such an arrangement being illustrated in FIGURE 1 of the drawings.

Figure 5:
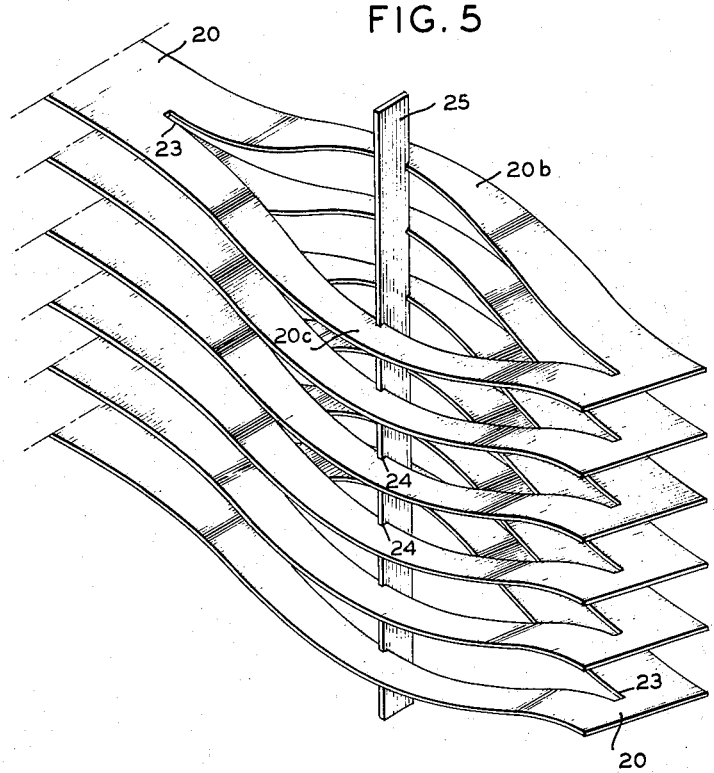
FIGURE 5 is a fragmentary sectional view illustrating a group of panels in normal expanded configuration.

After the panels have been installed in or attached to the frame, the spring bar is rotated 90°, thereby entering into the notches 24 and being locked therein against inadvertent disengagement, producing the expanded configuration illustrated in FIGURE 2 of the drawings and also shown fragmentarily in FIGURE 5 on an enlarged scale. The spreading or expanding action created by the forceful rotation of the spring bar 25 against the opposed edges of the slot 23 is such that one side 20b of the slat 20 is curved upwardly with the free edge directed downwardly while the opposite side 20c is curved downwardly with the free edge directed upwardly, a particularly interesting and ornamental sinusoidal effect being created.

Dependent upon the size of the area to be shaded, and the width of the solar screen required, each screen panel may have a plurality of slots 23, each provided with a spreader bar 25. In FIGURES 1 and 2 of the drawings, two such arrangememnts have been illustrated and it will be understood that this is in no manner limiting and that the distance or space in the panels between slots will constitute the interruption of the screen module. Thus, each solar screen may have one centrally located module or a plurality thereof in accordance with specific requirements or as may be desired, subject only to width limitations, it being understood that where more than one module is provided and adjacent modules are relatively closely spaced, the sinusoidal effect or pattern will be substantially continuous.

If desired, the extremities 20a of the panels 20 may be fixedly secured to or within the side portions of the frame 10. The utilization of the spacer plates illustrated and described permits of a demountable association whereby panels and spring bars may be removed conveniently, whether for replacement or any other purpose as to provide substantially complete access to the wall area being shaded.

Surface ornamentation, or anodizing, may be employed to further enhance ornamentality, or to increase or inhibit reflective characteristics. Further, structures of the present invention may be employed for various other purposes such as screen walling surrounding open areas where a substantial measure of privacy is desired, for association with translucent roofing, skylights, and the like.

It will be apparent that various changes may be made in the invention without departing from the spirit and scope thereof and the invention is not to be considered limited to that which is shown in the drawings and described in the specification, and reference therefore is had to the claims for summaries of the novel features of construction and novel combinations of parts, for all of which protection is desired.

What is claimed is:

1. Screen wall structure providing substantially complete shade from direct light rays comprising a frame member and a plurality of relatively narrow horizontally disposed elongated panels having free edges thereon supported within said frame member in uniformly spaced vertical alignment, each of said panels being provided with at least one relatively narrow longitudinally disposed slot, and a vertically disposed spring bar of greater width than said slot extending through the vertically aligned slots of said horizontally disposed panels and positioned transversely thereof to expand said panels to provide light directing surfaces, the panel material on one side of each slot being curved upwardly with the free edge on said one side directed downwardly and the panel material on the opposite side of each slot being curved downwardly with the free edge on said opposite side directed upwardly.

2. Screen wall structure as set forth in claim 1 where said frame member includes vertically disposed side portions providing means for mounting said horizontally disposed panels in uniformly spaced vertical alignment.

3. Screen wall structure of the class set forth comprising a frame member and a plurality of relatively narrow horizontally disposed elongated panels having free edges thereon produced from relatively thin sheet material having inherent flexibility supported within said frame member in uniformly spaced vertical alignment, each of said panels being provided with at least one relatively narrow longitudinally disposed elongated slot, and a vertically disposed spring bar of greater width than said slot extending through the vertically aligned slots of said horizontally disposed panels and positioned transversely thereof to expand said panels to provide arcuate light directing surfaces, the panel material on one side of each slot being curved upwardly with the free edge on said one side directed downwardly and the panel material on the opposite side of each of said slot being curved downwardly with the free edge on said opposite side directed upwardly.

4. Screen wall structure as set forth in claim 3 where each longitudinal edge of said slot is provided with a centrally located notch and said transversely disposed spring bar is received within these opposed notches to lock said panel and spring bar in assembled and expanded relationship.

5. Screen wall structure as set forth in claim 3 where said frame member includes vertically disposed side portions of U-shaped configuration, the extremities of said panels extending into said side portions, each side portion including a spacer plate provided with uniformly spaced and vertically aligned slots, said extremities of said panels being received within said slots.

6. Screen wall structure as set forth in claim 5 where the slots in said spacer plates incline downwardly at an angle on the order of 15° to 45° from the shaded side of said screen to the opposite side thereof.

7. A solar screen comprising a frame member including vertically disposed side portions and a plurality of relatively narrow horizontally disposed elongated panels produced from relatively thin strips of sheet material having inherent flexibility mounted between said side portions in uniformly spaced vertical alignment, each of said panels having free edges thereon and being provided with a plurality of relatively narrow longitudinally aligned elongated slots, each side wall of said frame being provided with a centrally located notch, said slots being located in vertically aligned series, and a vertically disposed spring bar of greater width than said slot extending through each series of slots and positioned transversely to expand said panels to provide arcuate light directing surfaces, the panel material on one side of each slot being curved upwardly with the free edge on said one side directed downwardly and the panel material on the opposite side of each slot being curved downwardly with the free edge on said opposite side directed upwardly, the vertical edges of said spring bars being received within the opposed notches in said slots to lock said spring bars and panels in assembled expanded relationship.

8. Screen structure comprising a plurality of horizontally disposed elongated panels produced from relatively thin sheet material having inherent flexibility, said panels being arranged in spaced vertical alignment and each of said panels having free edges thereon and being provided with at least one relatively narrow and longitudinally disposed elongated slot, and a vertically disposed spring bar of greater width than said slot extending through the vertically aligned slots of said panels and positioned transversely thereof to expand said panels to provide arcuate light directing surfaces, the panel material on one side of each slot being curved upwardly with the free edge on said one side directed downwardly and the panel material on the other side of each slot being curved downwardly with the free edge on said other side directed upwardly and means for locking said spring bar and panels in expanded relationship.

9. The method of producing a screen of the class set forth which includes the steps of arranging in vertical alignment a plurality of elongated spaced panels each of which has a narrow longitudinal slot therein, inserting a narrow spring bar of substantially greater width than said slot into the aligned slots of said panels, and rotating said spring bar 90° to expand said slots and panels to provide arcuate light directing surfaces.

References Cited by the Examiner
UNITED STATES PATENTS

| | | | |
|---|---|---|---|
| 2,305,918 | 12/1942 | Belsky | 52—473 X |
| 3,039,155 | 6/1962 | Iacovoni | 20—63 |
| 3,072,230 | 1/1963 | Gelert | 52—473 |
| 3,191,728 | 6/1965 | David | 52—473 |

HARRISON R. MOSELEY, *Primary Examiner.*

P. C. KANNAN, *Assistant Examiner.*